US006556560B1

(12) United States Patent
Katseff et al.

(10) Patent No.: US 6,556,560 B1
(45) Date of Patent: *Apr. 29, 2003

(54) LOW-LATENCY AUDIO INTERFACE FOR PACKET TELEPHONY

(75) Inventors: Howard Paul Katseff, Englishtown, NJ (US); Robert Patrick Lyons, Jackson, NJ (US); Bethany Scott Robinson, Lebanon, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,226

(22) Filed: Dec. 4, 1997

(51) Int. Cl.[7] .................. H04L 12/66; H04L 12/28; H04L 7/00; H04L 25/00
(52) U.S. Cl. .................. 370/352; 370/412; 375/372; 375/355
(58) Field of Search .................. 370/352, 412, 370/389, 428, 429, 356, 545, 353, 354, 355; 375/355, 372, 231; 364/400.01; 704/200, 201, 203, 219, 262

(56) References Cited

U.S. PATENT DOCUMENTS

| | | | | |
|---|---|---|---|---|
| 5,109,482 A | | 4/1992 | Bohrman ............... | 395/154 |
| 5,159,447 A | | 10/1992 | Haskell et al. ......... | 358/133 |
| 5,191,645 A | | 3/1993 | Carlucci et al. ......... | 395/159 |
| 5,193,148 A | | 3/1993 | Alcorn et al. ........... | 395/157 |
| 5,222,101 A | * | 6/1993 | Ariyavistakul et al. .. | 375/231 |
| 5,237,648 A | | 8/1993 | Mills et al. ............. | 395/133 |
| 5,287,182 A | | 2/1994 | Haskell et al. ......... | 348/500 |
| 5,384,772 A | * | 1/1995 | Marshall ................ | 370/235 |
| 5,541,354 A | * | 7/1996 | Farrett et al. ........... | 84/603 |
| 5,544,170 A | | 8/1996 | Kasahara ............... | 370/84 |
| 5,598,353 A | * | 1/1997 | Heyl ..................... | 364/514 R |

(List continued on next page.)

FOREIGN PATENT DOCUMENTS

| | | | |
|---|---|---|---|
| EP | 0 271 866 A2 | 12/1987 | ............... 88/25 |
| EP | 0 460 867 A2 | 5/1991 | ............... 91/50 |
| EP | 0 548 597 A1 | 12/1992 | ............... 93/26 |

OTHER PUBLICATIONS

Ran et al. "Designing an ON–Demand Multimedia Service" IEEE Communication Magazine, v30 iss7, Jul. 1992.

Megiddo et al. "The Minimum Reservation Rate Problem in Digital Audio/Video", Israel Symposium on Theory of Computing, 1993.

Revindran et al. "Delay Compensation Protocols for Synchronization of Multimedia Data Streams", IEEE Trans. on Knowledge and Data Engineering, v5 iss4, Aug. 1993.

(List continued on next page.)

Primary Examiner—Hassan Kizou
Assistant Examiner—Hanh Nguyen

(57) ABSTRACT

In a method for reducing latency in packet telephony caused by buffering at the conversion stage between analog audio signals and digital audio data, analog audio is sampled at a rate far greater than necessary for telephony. The increased sampling rate allows the audio data to pass much more rapidly through the data conversion buffer. After passing through the buffer, the data is downsampled to a rate normally used for telephony. To handle audio data for speaker output, the data is upsampled to a rate far in excess of the rate necessary for processing telephony-grade voice signals. The increased sampling rate allows the audio data to pass much more rapidly through the data conversion buffer. After passing through the buffer, the data is converted into an analog audio signal for sending to the speaker. In this way, latency due to the buffering that accompanies the process of converting audio signals to digital data, or vice versa, is minimized.

48 Claims, 2 Drawing Sheets

U.S. PATENT DOCUMENTS

| | | | | |
|---|---|---|---|---|
| 5,623,490 | A | | 4/1997 | Richter et al. ............... 370/263 |
| 5,721,537 | A | * | 2/1998 | Protas ................... 340/825.44 |
| 5,808,221 | A | * | 9/1998 | Ashour et al. ................ 84/603 |
| 5,822,537 | A | | 10/1998 | Katseff et al. ......... 395/200.61 |
| 5,860,065 | A | * | 1/1999 | Hsu ........................... 704/270 |
| 5,883,891 | A | * | 3/1999 | Williams et al. ............ 370/356 |
| 5,953,322 | A | * | 9/1999 | Kimball ...................... 370/328 |
| 5,953,411 | A | * | 9/1999 | Farrell ........................ 379/410 |
| 5,955,691 | A | * | 9/1999 | Suzuki et al. ................ 84/604 |
| 5,956,680 | A | * | 9/1999 | Behnke et al. .............. 704/258 |
| 5,963,153 | A | * | 10/1999 | Rosefield et al. ............ 341/61 |
| 5,969,654 | A | * | 10/1999 | Goldin ....................... 341/141 |
| 6,137,839 | A | * | 10/2000 | Mannering et al. ......... 375/260 |
| 6,141,340 | A | * | 10/2000 | Jain ........................... 370/352 |
| 6,188,677 | B1 | * | 2/2001 | Oyama et al. ............... 370/271 |
| 6,195,358 | B1 | * | 2/2001 | Bowater et al. ............. 370/356 |

OTHER PUBLICATIONS

Haskin, Roger L., "The Shark Continuous–Media File Server," Digest of Papers, COMPCON Spring '93, San Francisco, California, Feb. 22–26, 1993, pp. 12–15.

Katseff, Howard P. and London, Thomas B., "The Ferret Document Browser," USENIX Summer 1993 Technical Conference, Cincinnati, Jun. 1993.

Lesk, Michael, "Television Libraries for Workstations: An All–Digital Storage, Transmission and Display for Low rate Video," (apparently unpublished).

O'Gorman, Lawrence, "Image and Document Processing Techniques for the RightPages Electronic Library System," Proceedings of the 11$^{th}$ IAPR International Conference on Pattern Recognition, The Hague, Nethlands, Aug. 30–Sep. 3, 1992, vol. II, Conference B: Pattern Recogbition Methodology and Systems, IEEE Computer Society Press, California, pp. 260–263.

Poole, Lon, "Quicklime In Motion: Pasting Movies Into Documents Will Be As Easy As Pasting Graphics," Mac–world, Sep. 1991, pp. 154–159.

Rangan, P. Venkat, Vin, Harrick M. and Ramanathan, Srinivas, "Designing An On–Demand Multimedia Service," IEEE Communications Magazine, vol. 30, No. 7, Jul. 1992, pp. 56–64.

Rowe, Lawrence A. and Smith, Brian C., "A Continuous Media Player," Proceeding of the 3$^{rd}$ International Workship on Network and OS Support for Digital Audio and Video, San Diego, CA, Nov. 1992.

Rowe, Lawrence A. and Larson, Ray R., "A Video–on–Demand System," (apparently unpublished).

Semilof, Margie, "NetWare to Get Multimedia Hooks," Communications Week, No. 469, Aug. 30, 1993, pp. 21–22.

Story, Guy A., O'Gorman, Lawrence, Fox, David Schaper, Louise Levy, and Jagadish, H. V., "The RightPages Image–Based Electronic Library for Altering and Browsing," Computer, Sep. 1992, pp. 17–26.

Tobagi, Fouad A. and Pang, Joseph, "StarWorks–A Video Applications Server," Digest of Papers COMPCON Spring '93, San Francisco, California, Feb. 22–26, 1993, IEEE Computer Society Press, pp. 4–11.

"Interview: Expert Discusses Multimedia Implementations on Networks," Communications Week, No. 471, Sep. 13, 1993 pp. 22–23.

Press Syndicate of the University of Cambridge, Scenario–based Hypermedia: A Model and a System, 1990.

* cited by examiner

LOW-LATENCY AUDIO INTERFACE FOR PACKET TELEPHONY

The present application is related to U.S. application entitled "Low-latency Buffering for Packet Telephony," which is filed on even date herewith. These two applications are co-pending and commonly assigned.

TECHNICAL FIELD

This invention relates to packet telephony in general and, more particularly, provides a way of reducing latency in packet telephony communications.

BACKGROUND OF THE INVENTION

Packet telephony involves the use of a packet network, such as the Internet or an "intranet" (modeled in functionality based upon the Internet and used by a companies locally or internally) for telecommunicating voice, pictures, moving images and multimedia (e.g., voice and pictures) content. Instead of a pair of telephones connected by switched telephone lines, however, packet telephony typically involves the use of a "packet phone" or "Internet phone" at one or both ends of the telephony link, with the information transferred over a packet network using packet switching techniques. A "packet phone" or "Internet phone" typically includes a personal computer (PC) running application software for implementing packetized transmission of audio signals over a packet network (such as the Internet); in addition, the PC-based configuration of a packet or Internet phone typically includes additional hardware devices, such as a microphone, speakers and a sound card, which are plugged or incorporated into the PC.

The amount of time it takes for a communication to travel through a communications network is referred to as latency. The amount of latency can impact the quality of the communication; the higher the latency, the lesser the quality of the communication. Latency of about 150 milliseconds (ms) or more produces a noticeable effect upon conversations that, for some people, can render a conversation next to impossible. The Plain Old Telephone Service (POTS) network controls latency to an acceptable degree, which is one of the ways in which the POTS network is deemed a reliable and quality communications service.

However, latency is a significant problem in packet telephony. Latency problems may be caused by factors such as traffic congestion or bottlenecks in the packet network, which can delay delivery of packets to the destination.

One source of latency comes from the data buffers typically used with sound cards employed in PC-based packet telephone applications. These buffers, which are used to accompany the process of converting analog audio signals into digital audio data (and vice-versa), are set to a size determined by the operating system for the PC. Until recently, these buffers were of a fixed size; a recent revision in the Microsoft Windows™ operating system now permits variable-size buffers. However, by virtue of the fact that audio data is not normally clocked out of the buffers until the buffer fills, there is a latency introduced between the time the data enters the buffer and the time at which the data exits the buffer; that is, the audio data will reside in the buffer for a period of time equivalent to the "length" of the buffer. Accordingly, perceptible latency is introduced as a result of this buffering, often making interactive conversations difficult or unnatural (particularly where the buffer size is poorly "tuned" for packet telephony).

What is desired is a way of reducing the latency in packet telephony communications caused by buffering accompanying the analog-digital conversion process in sound cards.

SUMMARY OF THE INVENTION

The present invention is directed to a method for reducing latency in packet telephony introduced by data buffering in the analog-digital conversion process. In handling speech to be output to the packet network, the analog signal from the microphone is sampled at a sampling rate far exceeding the rate necessary for transmitting telephony-grade voice signals. The increased sampling rate allows the audio data to pass much more rapidly through the data conversion buffer. After passing through the buffer, the data is downsampled to a rate normally used for telephony. To handle audio data input from the packet network for playing over the PC speaker, the data is upsampled to a rate far in excess of the rate necessary for processing telephony-grade voice signals. The increased sampling rate allows the audio data to pass much more rapidly through the data conversion buffer. After passing through the buffer, the data is converted into an analog audio signal for sending to the speaker. In this way, latency due to the buffering that accompanies the process of converting audio signals to digital data, or vice versa, is minimized.

DETAILED DESCRIPTION

The present invention is directed to a method for reducing latency in packet telephony introduced by data buffering that accompanies the analog-digital conversion process. In accordance with the present invention, the sampling rate used for converting analog audio signals to digital audio data, and vice versa, is set to a rate substantially higher than that required for telephony-grade voice transmission so that the data moves through the conversion buffers at a proportionally greater speed.

Figure 1:
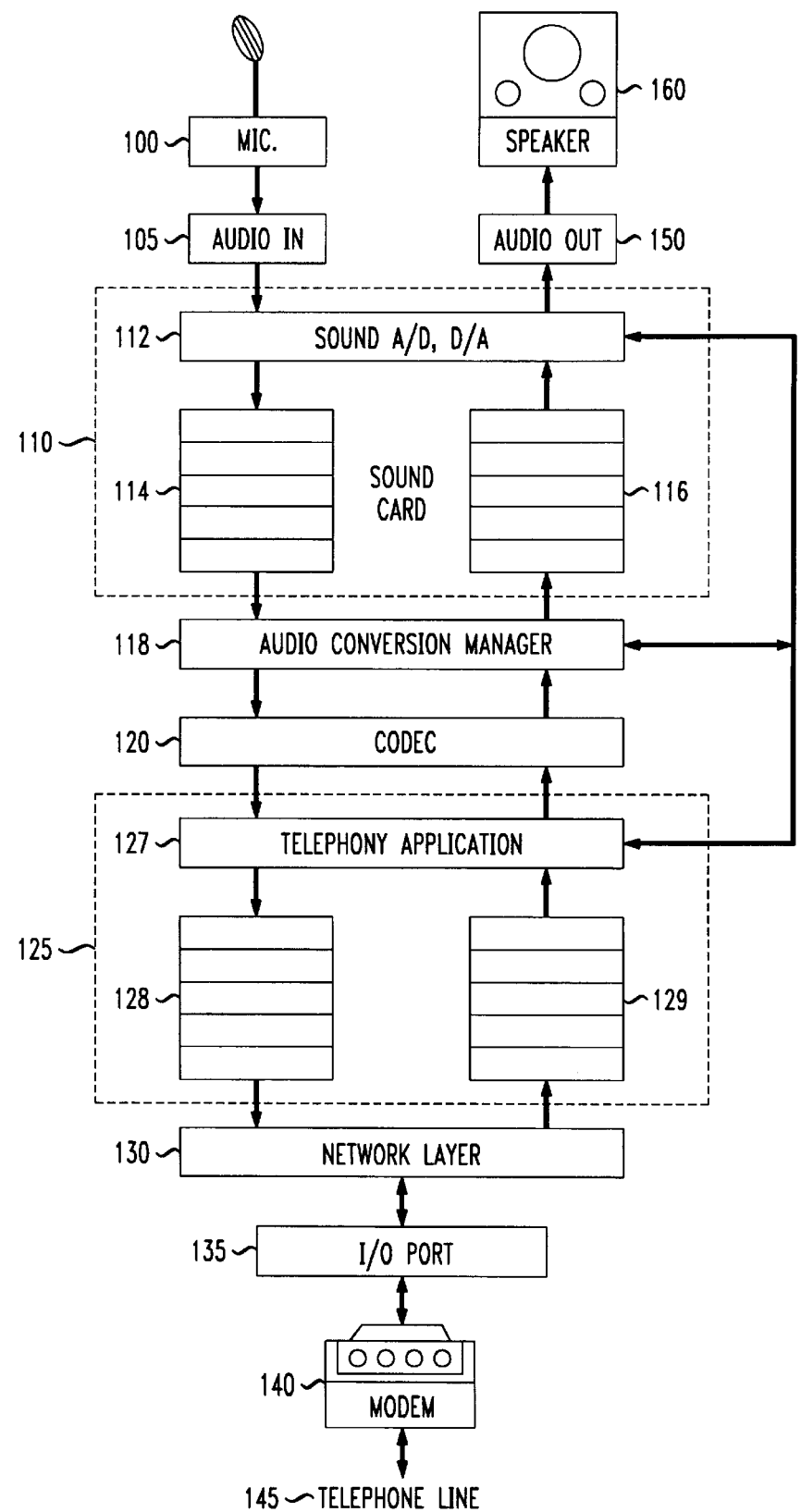
FIG. 1 shows a functional diagram for a PC-based packet phone utilizing the audio conversion management of the present invention.

FIG. 1 shows a functional diagram for a PC-based packet phone utilizing the audio conversion management of the present invention; the functionality shown in FIG. 1 is based upon the hardware/software functionality typically found in a PC-based packet phone.

Handling Audio for Output to the Packet Network

When a first user begins to speak into microphone 100 (which serves as the analog audio input device for the packet phone), an analog audio signal from microphone 100 is received into the PC-based packet phone via audio input port 105. Audio input port 105 is connected to sound card 110. The analog audio signal is delivered to sound card 110, which has an analog-to-digital (A/D) converter 112 for digitizing the input analog audio signal. Sound card 110 may be any one of a number of standard PC sound cards, such as the SoundBlaster™ 16 from Creative Labs. Sound card 110 also typically contains a pair of data conversion buffers 114 and 116. Data conversion buffer 114 buffers the audio data received from audio input port 105 and digitized by A/D converter 112 before being sent to CODEC 120. Typically, this data buffering is performed in accordance with an established protocol, such as that provided by a standard Microsoft audio driver supplied with the Microsoft Windows™ operating system.

As discussed above, this buffering introduces latency in the stream of audio data to be processed. In accordance with the present invention, audio conversion manager 118 operates in conjunction with telephony application 127 to control the process of converting the incoming analog audio signals into digital audio data. This is accomplished by taking advantage of the sampling capabilities of sound A/D converter 112; while telephony applications typically cause A/D conversion to occur at rates less than 16 kHz—as telephony-grade voice signals do not necessitate sampling rates in the higher audio frequencies—sound cards typically have the capability of handling sampling rates of up to 44 kHz, which is the standard sampling rate used for audio compact discs (CDs).

When audio conversion manager 118 in conjunction with telephony application 127 causes sound A/D converter 112 to digitize incoming audio signals at a higher sampling rate, this causes the digitized audio data to move through data conversion buffer 114 at a proportionally greater rate. In this way, latency normally introduced by virtue of the delay in getting the audio data through buffer 114 and into CODEC 120 is minimized. To compensate for the higher sampling rate—which produces a proportionally higher amount of audio data—the audio data is downsampled (e.g., decimated) by audio conversion manager 118 prior to audio encoding by CODEC 120. The downsampling may be accomplished as part of a pre-processing filter operation or as part of the CODEC processing.

Once the data is clocked out of conversion buffer 114 and downsampled by audio conversion manager 118, CODEC 120 compresses the audio data for efficient transmission over the packet network. CODEC 120 may, typically, be either a hardware or software component that is well-known in communications and telephony applications to those skilled in the art. The packet telephony product is a telephony program 125 having a telephony application 127 and data buffers 128 and 129. Telephony application 127 implements the functionality needed to prepare the data for transmission over a packet network. For example, telephony application 127 places the data into a form compatible with a data communications protocol used for transmitting data over a packet network. Telephony output buffer 128 buffers the data output by telephony application 127. Telephony output buffer 128 is kept as short as possible and is used to buffer data going out to the packet network in the event the network becomes temporarily busy at a particular instant, so that outgoing packets are not lost.

The audio data from telephony output buffer 128 is then processed by network layer 130. Telephony application 127 requests that network layer 130 play data out of telephony buffer 128 as soon as placed in the buffer. Network layer 130 is a software communications application which adds one or more layers of data protocol, such as the well-known Transmission Control Protocol and Internet Protocol (TCP/IP), or the known User Datagram Protocol and Internet Protocol (UDP/IP), and/or the well-established point-to-point protocol (PPP) used for communicating over a packet network. TCP/IP is typically used for control and setup, while UDP/IP is often used for transmitting audio data because UDP/IP does not cause lost packets of audio data to be retransmitted. UDP/IP may be preferred for transmitting audio data because, for packet telephony, retransmitting lost audio data will degrade a conversation. PPP is typically employed when a modem is used to permit the PC connect to a packet network, such as the Internet, using a standard dial-up telephone line. Network layer 130 is typically included as the network stack in the Microsoft Windows™ operating system. Data is then sent to input/output (I/O) port 135, which is a standard serial port used for establishing a serial data connection between a PC and a peripheral device, such as a modem.

From I/O port 135, the data proceeds to modem 140, which converts the data to tones suitable for transmission over a standard POTS telephone line 145 to a connecting service used to connect to a packet network, such as the Internet.

It should be noted that connecting a PC to a packet network, such as the Internet, may be accomplished by any number of known techniques, such as through the use of a modem over a telephone line described above. Access to a packet network, such as the Internet, may also be accomplished through, e.g., use of an ISDN line, a cable television line, or a local area network using techniques known to those skilled in the art.

Once the data is sent to the packet network, the packet network transmits the data to a second user having a receiving terminal (e.g., another PC-based packet phone) at the other end of a TCP/IP-compatible connection established between the two users.

Figure 2:
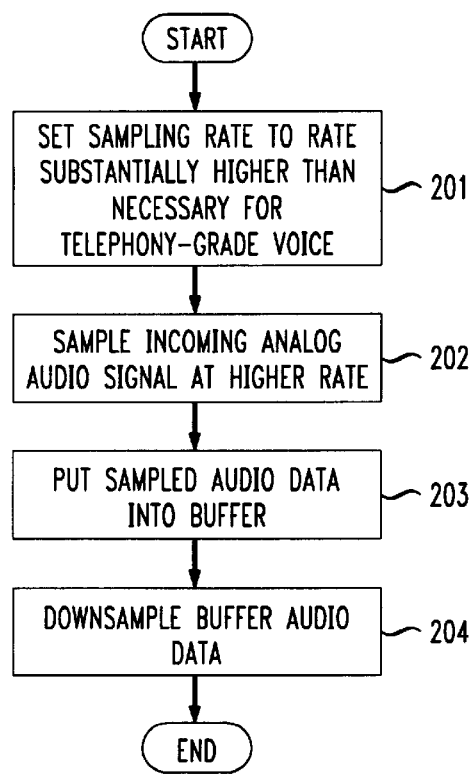
FIG. 2 is a flow diagram showing an aspect of the audio conversion management process of the present invention.

Further details of the present invention are shown in the flow diagram in FIG. 2. On the output side of the packet telephony system (i.e., transmission of audio data to packet network), the analog signal from the microphone is presented to A/D converter 112 to be converted into digital form. As shown in block 201 of FIG. 2, the sampling rate for the A/D conversion process is selected, or set, to an interim rate significantly higher than the final output rate, i.e., the rate at which data is output to the packet network. The output rate may be, e.g., a rate sufficient needed for transmitting telephony-grade voice signals. Illustratively, the sampling rate may be set to approximately the CD standard rate of 44 kHz, a rate which presents advantages both because many sound cards support such a rate and because it is a sufficiently high frequency such that the output rate may be an integer submultiple of the sampling rate; this makes downsampling relatively simple to implement via decimation of the digital audio data by a factor of four-to-one (assuming, for purposes of illustration, that the output data rate is approximately 11 kHz).

At block 202, the analog signal is sampled at the excess rate set in block 201 and put into conversion buffer 114 as shown in block 203. If the illustrative rate of 44 kHz is used, it would allow data to pass through the buffer at about four times the normal speed (again, producing a four-fold reduction in latency). Finally, after the data exits from the conversion buffer, it is decimated by a factor sufficient to reduce the frequency range to acceptable quality levels to be encoded and ultimately transmitted over the packet network.

Handling Audio Input Received from the Packet Network

For purposes of the various aspects and embodiments of the invention described below, it is assumed that a PC-based packet telephony system operates as discussed above with reference to the functional diagram of FIG. 1.

The second user may transmit audio or speech data back to the first user. The process of receiving external audio data from the second user over the packet network into the first user's PC-based packet phone is, in many respects, a reversal of the steps described above in connection with sending audio data from the first user's packet phone to the second user over the packet network. The external audio data is received from a packet network connecting service (i.e., Internet service provider) over POTS telephone line 145 into modem 140, which converts the data from tones into digital data. From modem 140 the data proceeds to I/O port 135 and then to network layer 130, which removes one or more protocol layers (such as TCP/IP, UDP/IP and/or PPP).

After network layer 130, the data is sent to telephony application 125 which directs the data into telephony input buffer 129. Once the data is played from telephony input buffer 129, it proceeds through the rest of the telephony and audio processing. Upon leaving input buffer 129, the data is processed by telephony application 127 and is sent to CODEC 120. CODEC 120 decompresses the audio data that was compressed (by the transmitting packet phone) for transmission over the packet network. From CODEC 120 the audio data is then sent to data buffer 116 of sound card 110.

In accordance with the present invention, audio conversion manager 118 operates in conjunction with telephony application 127 to control the process of converting the digital audio data into analog audio signals. This is accomplished by essentially reversing the sampling process described above. Thus, once the input audio data is decoded by the CODEC, the audio is upsampled to a higher rate and delivered to data buffer 116, which buffers the audio data before the data is converted into analog form by D/A converter 112 and sent as an analog signal through analog audio output port 150 to speaker 160.

Figure 3:
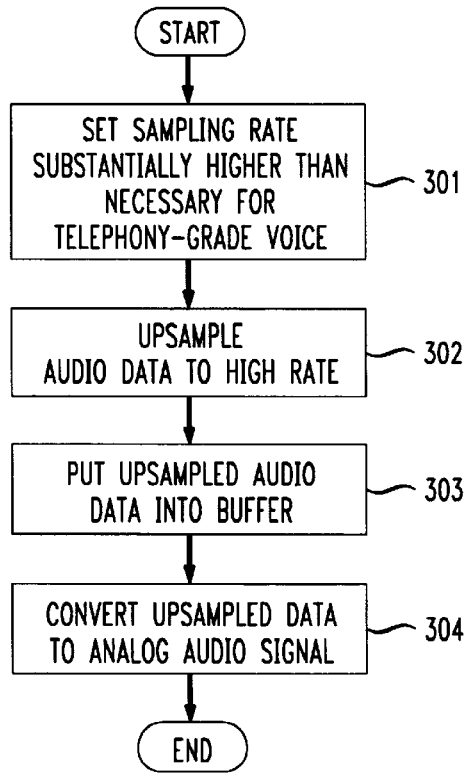
FIG. 3 is a flow diagram showing another aspect of the audio conversion management process of the present invention.

The process for handling data received from the packet network is shown in the flow diagram of FIG. 3. An effective interim data sampling rate is selected, or set, at block 301 to a rate significantly higher than the input data rate (i.e., the data rate of the digital audio data arriving over the packet network from the second user's terminal), such as e.g., a rate sufficient for transmitting telephony-grade voice signals over the packet network. As shown in block 302, the data is upsampled (after the audio data has been decoded) to the selected higher rate. Upsampling may be accomplished by interpolation, techniques for which are well known (such as, e.g., linear interpolation). Illustratively, as discussed above the upsampling rate may be set to approximately the CD standard rate of 44 kHz. Assuming, for purposes of illustration, that the input data rate (from the audio data coming in from the packet network) is approximately 11 kHz, the illustrative upsampling rate of 44 kHz makes upsampling relatively simple to implement via linear interpolation of the digital audio data by a factor of one-to-four.

Once the signal is upsampled, it is passed through the data conversion buffer at block 303. Because of the increased rate, the data passes through the buffer much more quickly. The upsampled audio data is converted to an analog audio signal by the D/A converter (which is set to the higher rate) at block 304.

Each aspect of the present invention described above is utilized as a continuing, real-time process rather than a batch process. Thus, as audio is processed in accordance with the present invention, additional audio may be presented either as speech at the microphone or as data received from the packet network, such that the additional audio is processed on a continuing basis even as yet more audio arrives.

In summary, the present invention provides a way of reducing latency in packet telephony which is introduced by data buffering that accompanies the analog-digital conversion process.

What has been described is merely illustrative of the application of the principles of the present invention. Other arrangements and methods can be implemented by those skilled in the art without departing from the spirit and scope of the present invention.

What is claimed is:

1. In a packet telephony communication system, a method for handing audio data for output to a packet network, comprising the steps of:

a. selecting an interim data rate for processing audio information, wherein said interim rate is substantially higher than an output data rate to reduce latency in a buffer;

b. converting audio information to audio data having a data rate equal to the selected interim data rate;

c. buffering in said buffer the converted audio data stream; and d. downsampling the data rate of the buffered audio data stream to a rate equal to the output data rate, such flat performing said selecting, converting, buffering and downsampling steps results in reducing latency.

2. The method according to claim 1, wherein the output data rate is a rate sufficient for transmission of telephony-grade voice signals over the packet network.

3. The method according to claim 1, wherein the step of converting audio information to an audio data stream having a data rate equal to the selected interim data rate comprises sampling analog audio signals at the selected interim data rate.

4. The method according to claim 1, wherein the selected interim data rate is an integer multiple of the output data rate.

5. The method according to claim 4, wherein the step of downsampling the buffered audio data comprises the step of decimating the buffered audio data by a factor equal to the ratio of the selected interim data rate to the output data rate.

6. The method according to claim 4, wherein the selected interim data rate is approximately 44 kHz and the step of downsampling the buffered audio data comprises the step of decimating the buffered audio data by a factor of four.

7. The method according to claim 1, wherein the selected interim data rate is a rate equal to the maximum data rate capacity of the telephony communication system.

8. In a packet telephony communication system, a method for handling audio data input from a packet network, comprising the steps of:

a. selecting an interim data rate for processing an audio data stream, wherein said interim rate is substantially higher than an input data rate to reduce latency in a buffer;

b. upsampling the data rate of the audio data stream to a rate equal to the selected interim data rate;

c. buffering in said buffer the upsampled audio data stream; and d. processing the buffered audio data at the selected interim data rate, such that performing said selecting, upsampling, buffering and processing steps results in reducing latency.

9. The method according to claim 8, wherein the input data rate is a rate sufficient for reception of telephony-grade voice signals over the packet network.

10. The method according to claim 8, wherein the step of processing the buffered audio data at the selected interim data rate comprises converting the buffered audio data to analog audio signals.

11. The method according to claim 10, wherein selected interim data rate is an integer multiple of the input rate.

12. The method according to claim 11, wherein the step of upsampling audio data from the audio data stream to the selected interim data rate comprises interpolating the audio data by a factor equal to the ratio of the selected interim data rate to the input data rate.

13. The method according to claim 11, wherein the selected interim data rate is approximately 44 kHz and the step of upsampling audio data from the audio data stream to the selected interim data rate comprises interpolating the audio data by a factor of four.

14. The method according to claim 8, wherein the selected interim data rate is a rate equal to the maximum data rate capacity of the telephony communication system.

15. In a packet telephony communication system, a method for handling audio data for output to or input from a packet network, comprising the steps of:
  a. processing audio information for output to the packet network, including the substeps of:
    i. selecting a first interim data rate for processing the audio information for output to the packet network, wherein said first interim data rate is substantially higher than an output data rate to reduce latency in a first buffer;
    ii. converting audio information to a first audio data stream having a data rate equal to the selected first interim data rate;
    iii. buffering in said first buffer the first audio data stream; and
    iv. downsampling the data rate of the buffered first audio data stream to a rate equal to the output data rate; and
  b. processing audio information input from the packet network, including the substeps of:
    i. selecting a second interim data rate for processing the audio information input from the packet network, wherein said second interim data rate is substantially higher than an input data rate;
    ii. upsampling the data rate of a second audio data stream to a rate equal to the selected second interim data rate to reduce latency in a second buffer;
    iii. buffering in said second buffer the upsampled second audio data stream; and
    iv. processing the buffered second audio data stream at the selected second interim data rate such that said processing audion information for output and said processing audio information input reduces latency.

16. The method according to claim 15, wherein at least one of the output data rate and the input data rate is a rate sufficient for transmission of telephony-grade voice signals over the packet network.

17. The method according to claim 15, wherein the step of converting audio information to a first audio data stream having a data rate equal to the selected first interim data rate comprises sampling analog audio signals at the selected first interim data rate.

18. The method according to claim 15, wherein the selected first interim data rate is an integer multiple of the output data rate.

19. The method according to claim 18, wherein the step of downsampling the buffered audio data comprises the step of decimating the buffered audio data by a factor equal to the ratio of the selected first interim data rate to the output data rate.

20. The method according to claim 18, wherein each of the selected first interim data rate and the selected second interim data rate is approximately 44 kHz, the step of downsampling the buffered audio data comprises the step of decimating the buffered audio data by a factor of four, and the step of upsampling audio data from the second audio data stream to the selected second interim data rate comprises interpolating the audio data by a factor of four.

21. The method according to claim 15, wherein the step of processing the buffered audio data from the converted second audio data stream at the selected second interim data rate comprises converting the buffered audio data to analog audio signals.

22. The method according to claim 21, wherein selected second interim data rate is an integer multiple of the input data rate.

23. The method according to claim 22, wherein the step of upsampling audio data from the second audio data stream to the selected second interim data rate comprises interpolating the audio data by a factor equal to the ratio of the selected second interim data rate to the input data rate.

24. The method according to claim 15, wherein at least one of the selected first interim data rate and the selected second interim data rate is a rate equal to the maximum data rate capacity of the telephony communication system.

25. An article of manufacture comprising a computer-readable medium having stored thereon instructions for use in conjunction with a computer-based packet telepony communication system, said instructions which, when executed, define a series of steps causing the packet telephony communication system to reduce latency in handling audio data for output to a packet network, said steps comprising:
  a. converting audio information to audio data having a selected interim data rate, wherein said selected interim rate is substantially higher than an output data rate to reduce latency in a buffer;
  b. buffering in said buffer the converted audio data stream; and
  c. downsampling the data rate of the buffered audio data stream to a rate equal to the output data rate, such that said converting, buffering and downsampling steps reduce latency.

26. The article of manufacture according to claim 25, wherein the output data rate is a rate sufficient for transmission of telephony-grade voice signals over the packet network.

27. The article of manufacture according to claim 25, wherein the step of converting audio information to an audio data stream having a data rate equal to the selected interim data rate comprises sampling analog audio signals at the selected interim data rate.

28. The article of manufacture according to claim 25, wherein the selected interim data rate is an integer multiple of the output data rate.

29. The article of manufacture according to claim 28, wherein the step of downsampling the buffered audio data comprises the step of decimating the buffered audio data by a factor equal to the ratio of the selected interim data rate to the output data rate.

30. The article of manufacture according to claim 28, wherein the selected interim data rate is approximately 44 kHz and the step of downsampling the buffered audio data comprises the step of decimating the buffered audio data by a factor of four.

31. The article of manufacture according to claim 25, wherein the selected interim data rate is a rate equal to the maximum data rate capacity of the telephony communication system.

32. An article of manufacture comprising a computer-readable medium having stored thereon instructions for use in conjunction with a computer-based packet telephony communication system, said instructions which, when executed, define a series of steps causing the packet telephony communication system to reduce latency in handling audio data input from a packet network, said steps comprising:
  a. upsampling the data rate of an audio data stream to a rate equal to a selected interim data rate, wherein said interim rate is substantially higher than an input data rate to reduce latency in a buffer;
  b. buffering in said buffer the upsampled audio data stream; and c. processing the buffered audio data at the selected interim data rate, such that said upsampling, buffering and processing steps reduce latency.

33. The article of manufacture according to claim 32, wherein the input data rate is a rate sufficient for reception of telephony-grade voice signals over the packet network.

34. The article of manufacture according to claim 32, wherein the step of processing the buffered audio data at the selected interim data rate comprises converting the buffered audio data to analog audio signals.

35. The article of manufacture according to claim 34, wherein selected interim data rate is an integer multiple of the input rate.

36. The article of manufacture according to claim 35, wherein the step of upsampling audio data from the audio data stream to the selected interim data rate comprises interpolating the audio data by a factor equal to the ratio of the selected interim data rate to the input data rate.

37. The article of manufacture according to claim 35, wherein the selected interim data rate is approximately 44 kHz and the step of upsampling audio data from the audio data stream to the selected interim data rate comprises interpolating the audio data by a factor of four.

38. The article of manufacture according to claim 32, wherein the selected interim data rate is a rate equal to the maximum data rate capacity of the telephony communication system.

39. An article of manufacture comprising a computer-readable medium having stored thereon instructions for use in conjunction with a computer based packet telephony communication system, said instructions which, when excuted, define a series of steps causing the packet telephony communication system to reduce latency in handling audio data for output to or input from a packet network, said steps comprising:

a. processing audio information for output to the packet network, including the substeps of:
  i. selecting a first interim data rate for processing the audio information for output to the packet network wherein said first interim data rate is substantially higher thin an output data rate to reduce latency in a first buffer;
  ii. converting audio information to a first audio data stream having a data rate equal to the selected first interim data rate;
  iii. buffering in said first buffer the first audio data stream; and
  iv. downsampling the data rate of the buffered first audio data stream to a rate equal to the output data rate; and b. processing audio information input from the packet network, including the substeps of:
  i. selecting a second interim data rate for processing the audio information input from the packet network, wherein said second interim data rate is substantially higher than an input data rate to reduce latency in a second buffer;
  ii. upsampling the data rate of a second audio data stream to a rate equal to the selected second interim data rate;
  iii. buffering in said second buffer the upsampled second audio data stream; and
  iv. processing the buffered second audio data stream at the selected second interim data rate, such that said processing audio information for output and said processing audio information input reduces latency.

40. The article of manufacture according to claim 39, wherein at least one of the output data rate and the input data rate is a rate sufficient for transmission of telephony-grade voice signals over the packet network.

41. The article of manufacture according to claim 39, wherein the step of converting audio information to a first audio data stream having a data rate equal to the selected first interim data rate comprises sampling analog audio signals at the selected first interim data rate.

42. The article of manufacture according to claim 41, wherein the selected first interim data rate is an integer multiple of the output data rate.

43. The article of manufacture according to claim 42, wherein the step of downsampling the buffered audio data comprises the step of decimating the buffered audio data by a factor equal to the ratio of the selected first interim data rate to the output data rate.

44. The article of manufacture according to claim 42, wherein each of the selected first interim data rate and the selected second interim data rate is approximately 44 kHz, the step of downsampling the buffered audio data comprises the step of decimating the buffered audio data by a factor of four, and the step of upsampling audio data from the second audio data stream to the selected second interim data rate comprises interpolating the audio data by a factor of four.

45. The article of manufacture according to claim 39, wherein the step of processing the buffered audio data from the converted second audio data stream at the selected second interim data rate comprises converting the buffered audio data to analog audio signals.

46. The article of manufacture according to claim 45, wherein selected second interim data rate is an integer multiple of the input data rate.

47. The article of manufacture according to claim 46, wherein the step of upsampling audio data from the second audio data stream to the selected second interim data rate comprises interpolating the audio data by a factor equal to the ratio of the selected second interim data rate to the input data rate.

48. The article of manufacture according to claim 39, wherein at least one of the selected first interim data rate and the selected second interim data rate is a rate equal to the maximum data rate capacity of the telephony communication system.

* * * * *

UNITED STATES PATENT AND TRADEMARK OFFICE
CERTIFICATE OF CORRECTION

PATENT NO.    : 6,556,560 B1
DATED         : April 29, 2003
INVENTOR(S)   : Howard Paul Katseff, Robert Patrick Lyons and Bethany Scott Robinson It is certified that error appears in the above-identified patent and that said Letters Patent is hereby corrected as shown below:

Column 7,
Line 34, "audion" is replaced with -- audio --

Column 9,
Line 41, "thin" is replaced with -- than --

Signed and Sealed this

Eighth Day of July, 2003

JAMES E. ROGAN
*Director of the United States Patent and Trademark Office*